United States Patent
Stiegler et al.

(10) Patent No.: US 6,862,289 B2
(45) Date of Patent: Mar. 1, 2005

(54) METHOD OF DATA TRANSMISSION IN A COMMUNICATION NETWORK WITH A RING CONFIGURATION

(76) Inventors: Andreas Stiegler, Epernayerstrasse 34, D-76275 Ettlingen (DE); Harald Schoepp, Erlenweg 30, D-76275 Ettkubgen (DE); Frank Baehren, Grenadierstrasse 25, D-76133 Karlsruhe (DE)

( * ) Notice: Subject to any disclaimer, the term of this patent is extended or adjusted under 35 U.S.C. 154(b) by 826 days.

(21) Appl. No.: 09/803,119

(22) Filed: Mar. 9, 2001

(65) Prior Publication Data

US 2002/0019883 A1 Feb. 14, 2002

(30) Foreign Application Priority Data

Mar. 10, 2000 (DE) .......................................... 100 11 330

(51) Int. Cl.[7] .............................................. H04L 12/28
(52) U.S. Cl. ........................ 370/403; 370/404; 370/406
(58) Field of Search ......................... 370/249, 403–406, 370/452, 460, 391, 392, 395.1, 395.5, 907; 709/251

(56) References Cited

U.S. PATENT DOCUMENTS

| | | | | |
|---|---|---|---|---|
| 4,866,704 A | * | 9/1989 | Bergman | ..................... 370/452 |
| 5,867,484 A | * | 2/1999 | Shaunfield | ............. 370/395.51 |
| 6,343,331 B1 | * | 1/2002 | Stirling | ....................... 709/251 |
| 6,647,327 B1 | * | 11/2003 | Wolf et al. | .................... 701/36 |

FOREIGN PATENT DOCUMENTS

| | | | | |
|---|---|---|---|---|
| DE | 196 42 258 C1 | 3/1998 | ........... | H04L/12/42 |
| WO | WO96/37985 | 11/1996 | ........... | H04L/12/43 |
| WO | WO98/36533 | 8/1998 | ........... | H04L/12/43 |

OTHER PUBLICATIONS

"Media Oriented Synchronous Transfer—A Network Protocol for High Quality, Low Cost Transfer of Synchronous, Asynchronous, and Control Data on Fiber Optic"; Patrick Heck et al., Sep. 1997.

* cited by examiner

*Primary Examiner*—Frank Duong
(74) *Attorney, Agent, or Firm*—Baker Botts L.L.P.

(57) ABSTRACT

A method of joint data transmission of digital source data and control data is provided between data sources and data sinks which are subscribers of a uni-directionally operated communication network having a ring configuration, in which source data and control data are transmitted in a format which prescribes a clocked sequence of individual bit groups of the same bit width which are transmitted in a continuous data stream, in each case specific bit positions predetermined by the format are reserved, in which the subscribers sample data in each case with a first sampling frequency and the communication network samples data with a second sampling frequency, which is an integral multiple of the first sampling frequency, in which, within each bit group, at least one contiguous region with a predetermined number of bit positions can be reserved for source data and the contiguous region(s) in each case have a beginning and a defined length and are in each case assigned to a subscriber address, in which at least one contiguous region within a bit group is in each case assigned a significant bit position, which in the case of one of the subscribers is set to a first logic level and in the case of all the other subscribers is set to an opposed, second logic level.

8 Claims, 3 Drawing Sheets

FIG 4

| | Teilnehmer 10 | Teilnehmer 14 |
|---|---|---|
| Frame n | xxxx xxxx xxxx xxx1 | xxxx xxxx xxxx xxxx |

| | Teilnehmer 11 | Teilnehmer 15 |
|---|---|---|
| Frame n+1 | xxxx xxxx xxxx xxx0 | xxxx xxxx xxxx xxxx |

| | Teilnehmer 12 | Teilnehmer 16 |
|---|---|---|
| Frame n+2 | xxxx xxxx xxxx xxx0 | xxxx xxxx xxxx xxxx |

| | Teilnehmer 13 | Teilnehmer 17 |
|---|---|---|
| Frame n+3 | xxxx xxxx xxxx xxx0 | xxxx xxxx xxxx xxxx |

| | Teilnehmer 10 | Teilnehmer 14 |
|---|---|---|
| Frame n+4 | xxxx xxxx xxxx xxx1 | xxxx xxxx xxxx xxxx |

| | Teilnehmer 11 | Teilnehmer 15 |
|---|---|---|
| Frame n+5 | xxxx xxxx xxxx xxx0 | xxxx xxxx xxxx xxxx |

| | Teilnehmer 12 | Teilnehmer 16 |
|---|---|---|
| Frame n+6 | xxxx xxxx xxxx xxx0 | xxxx xxxx xxxx xxxx |

| | Teilnehmer 13 | Teilnehmer 17 |
|---|---|---|
| Frame n+7 | xxxx xxxx xxxx xxx0 | xxxx xxxx xxxx xxxx |

21    2    23    23a    23

METHOD OF DATA TRANSMISSION IN A COMMUNICATION NETWORK WITH A RING CONFIGURATION

FIELD OF THE INVENTION

The present invention is a method of data transmission in a communication network with a ring configuration. More specifically, the invention relates to a method of joint data transmission of digital source data and control data between data sources and data sinks, which are subscribers of a uni-directionally operated communication network having a ring configuration.

BACKGROUND OF THE INVENTION

Methods of this type are used everywhere today where electronic and electrical devices of various types that are intended to exchange information with one another for the purpose of data communication are connected to one another, in a sometimes complicated way, by means of data lines and control lines. For instance, in the audio sector for example, the data communication between data sources networked with one another on the one hand—for example CD players, radio receivers, cassette recorders, microphones—and the data sinks connected to them on the other hand—for example amplifier-loudspeaker combinations—can be controlled by a method described above.

The network subscribers of various types of such a communication network are connected to one another by data lines in such a way that the data stream passes each of the subscribers of the communication network one after the other. This produces a communication network with a ring configuration, with particular advantages in particular for mobile applications, for example when used in a motor vehicle, or when used in the household, for example a multimedia network. The data transmission typical for the method stated above permits a simple connection of data sources and data sinks, which typically send and receive data continuously. The data transmission usually takes place synchronously with respect to a clock-pulse signal, since the quality requirements today, for example in the automotive sector, can generally only be met with acceptable expenditure by synchronous data transmission.

In the case of many communication networks, the network subscribers have the same sampling frequency and the same data width as the communication network. In the case of data transmission, a subscriber acting as a data source provides sampled data and transmits them in the form of a bit group to a corresponding data field of the communication network. An addressed network subscriber can subsequently read out this bit group that has just been sent via the communication network.

However, many communication networks having a ring configuration are increasingly expected to meet the requirement that their sampling frequency is very much greater than the respective sampling frequency of the network subscribers. Such a communication network is that known as the MOST network (Media Oriented Synchronous Transceiver Network), which is used in particular in the automotive sector and typically has an integral multiple of the sampling frequency of the connected subscribers. Here, in each case a network subscriber with a low sampling frequency transmits data to the MOST network. Since the sampling rate of the subscriber is a fraction of the sampling rate of the network, after the data transmission of a data burst of the sending network subscriber, the communication network is not fully utilized for the remaining duration of a time interval that the sending subscriber requires. During this time, however, the communication network is blocked for the other network subscribers, as a result of which utilization capacity of the communication network is given away. The utilization of the communication network is in this case only at most a corresponding fraction of its maximum data transmission capacity.

SUMMARY OF THE INVENTION

The present invention is therefore based on the object of providing a method of joint data transmission of digital source data and control data between data sources and data sinks that are subscribers of a uni-directionally operated communication network having a ring configuration which allows more efficient utilization of the data transmission capacity.

According to this invention, this object is achieved by a method of data transmission with the features of patent claim 1, that is to say by a method of the generic type:

in which source data and control data are transmitted in a format which prescribes a clocked sequence of individual bit groups of the same bit width which are transmitted in a continuous data stream, in each case specific bit positions predetermined by the format are reserved;

in which the subscribers sample data in each case with a first sampling frequency and the communication network samples data with a second sampling frequency, which is an integral multiple of the first sampling frequency;

in which, within each bit group, at least one contiguous region with a predetermined number of bit positions can be reserved for source data and the contiguous region(s) in each case have a beginning and a defined length and are in each case assigned to a subscriber address; and in which at least one contiguous region within a bit group is in each case assigned a significant bit position, which in the case of one of the subscribers is set to a first logic level and in the case of all the other subscribers is set to an opposed, second logic level.

With the present invention it is possible to bring about a higher efficiency in the data transmission by making it possible to ensure that theoretically all the subscribers connected to the communication network can transmit data via the communication network simultaneously. In this case, the communication network can be utilized very effectively.

The present invention is suitable in particular for a communication network in which the sampling frequency of the connected subscribers is synchronized with the sampling frequency of the network. It would of course also be conceivable for these sampling frequencies not be synchronized with one another, but for the second sampling frequency to have any desired phase shift with respect to the first sampling frequency. This arbitrary phase shift, which may be, for example, 10% of the period of oscillation of the second sampling frequency, ensures greater flexibility in the data transmission. In this case, however, the subscriber receiving the data, for example a transceiver, should comprise means for data buffering.

The description, which follows, of the method according to the invention was described on the basis of a specially designed communication network, to be specific a MOST network with four or eight connected subscribers, which in each case have a sampling frequency four times lower than the sampling frequency of the communication network. Advantageously, any desired number of the subscribers mentioned above may also be connected to the communication network. In addition, the sampling frequency of the communication network may advantageously also have any desired multiple of the sampling frequency of the connected subscribers.

In an advantageous embodiment, a significant bit is provided, defining a significant subscriber of the communication network, whereby all the other subscribers are likewise uniquely determined on account of the ring-like configuration of the communication network. This significant bit is formed in the present exemplary embodiment as an LSB-Bit, but may also be formed as any other desired bit position.

The communication network is suitable particularly advantageously for the data transmission of audio signals, since in particular the efficient utilization of the communication network is to be preferred at the expense of a single bit position. The loss of this single bit position can be tolerated in particular in the case of audio signals, since here there is only a slight loss in the quality of the data read out.

The method according to the invention is suitable particularly advantageously in a communication network designed as a MOST network, which is typically used in a motor vehicle or else in the household.

Further advantageous embodiments and developments of the invention can be taken from the dependant claims, the following description and the figures.

The invention is explained in more detail below on the basis of the exemplary embodiments indicated in, the figures of the drawing, in which:

BRIEF DESCRIPTION OF THE DRAWINGS

FIG. 4 schematically shows the data transmission in the case of eight network subscribers by means of a communication network with four times the sampling frequency.

In all the figures of the drawing, similar or functionally similar elements have been provided with the same reference numerals.

DETAILED DESCRIPTION OF THE EMBODIMENTS

Figure 1:
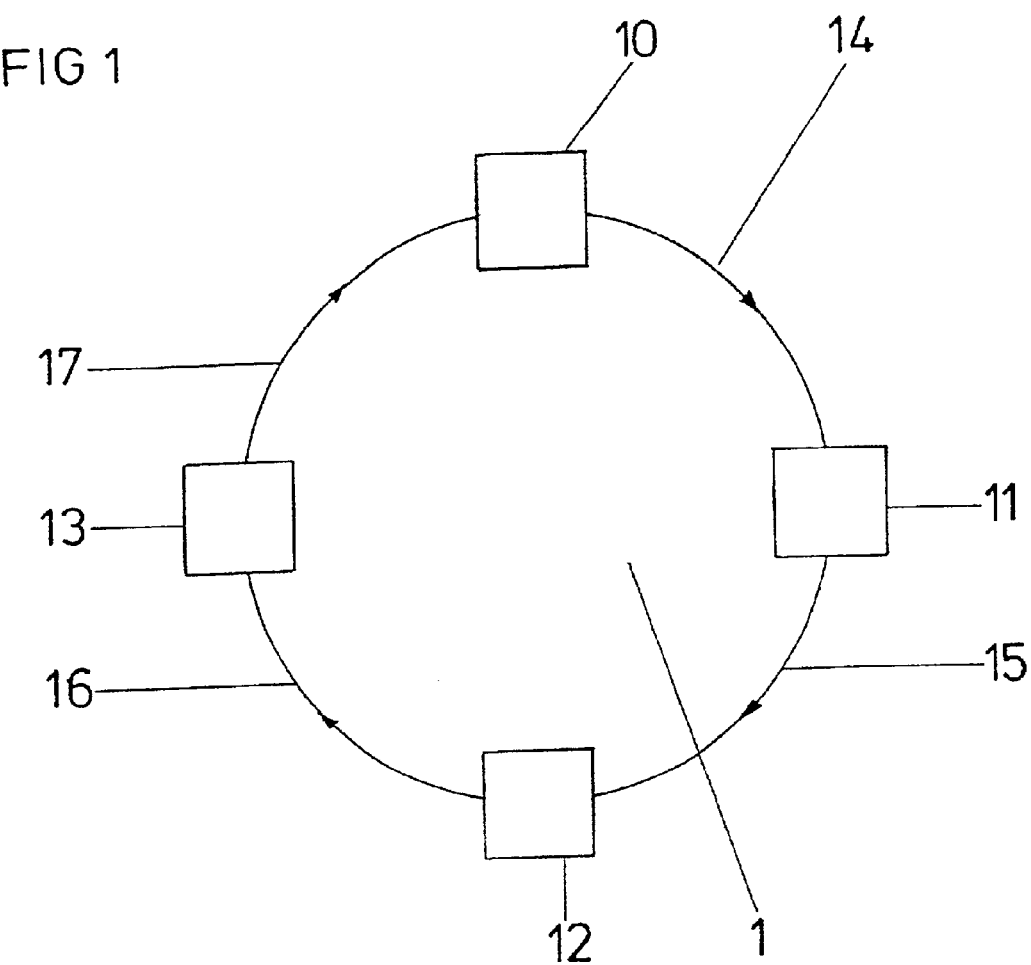
FIG. 1 shows a ring-shaped communication network with four network subscribers.

FIG. 1 shows a ring-shaped network 1, which in the present case is designed as a MOST network. The network 1 comprises four network subscribers 10, 11, 12, 13, one of the subscribers 10 being designed as a clock generator. The four subscribers 10, 11, 12, 13 are connected to one another in the form of a ring via uni-directionally operable data lines 14, 15, 16, 17 in such a way that a data stream can take place clockwise from one subscriber to the other 10, 11, 12, 13. The physical direction of the data transmission has been represented in FIG. 1 by arrows on the data lines 14, 15, 16, 17.

Figure 2:
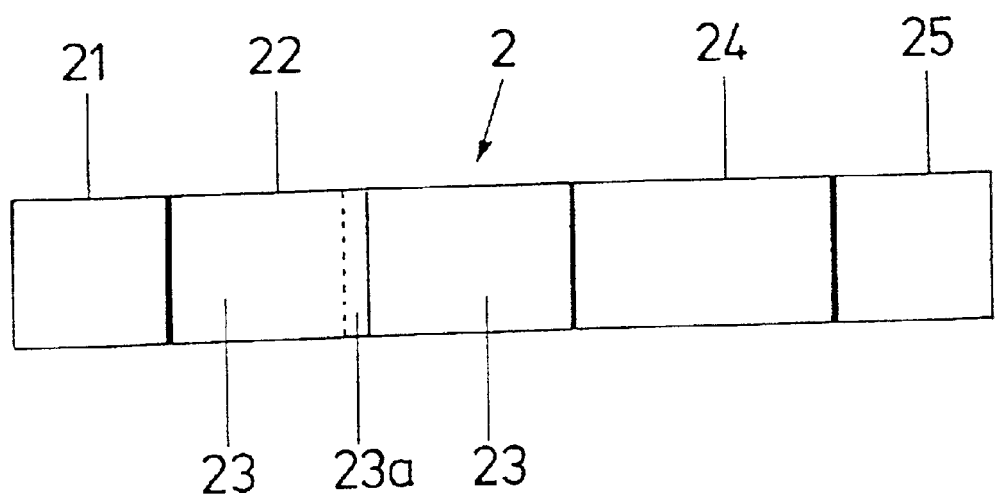
FIG. 2 shows the data transmission format used for the method according to the invention in a ringshaped communication network.

FIG. 2 shows the data transmission format used for the method according to the invention in a ring-shaped communication network corresponding to FIG. 1. In FIG. 2, a bit group, which is also referred to as a frame, is denoted by 2.

In the present exemplary embodiment, the bit group 2 comprises 64 bytes, that is to say 512 bits, which is an integral multiple of the lengths of bit groups in known transmission formats for synchronous data, so that compatibility with these formats is provided on account of the simple convertibility. The bit group 2 may, however, also have any other desired bit size.

The bit group 2 contains a preamble 21, which contains in particular data enabling a PLL circuit of a network subscriber to synchronize to a clock pulse received.

The preamble 21 is adjoined by a data field 22 for synchronous data. The data field 22 may be—but does not necessarily have to be—subdivided into several bit subgroups 23 of the same data width, which are in each case assigned to a specific subscriber. This assignment between the bit subgroups 23 and the respective subscribers is typically likewise defined in the preamble 21. The data field 22 in FIG. 2 has in the present exemplary embodiment two bit subgroups 23. At least one of the bit subgroups 23 has at the least-significant bit position 23a a single bit position that is also referred to hereafter as the LSB 23a (Least Significant Bit). This single bit position 23a may, however, also be arranged at any other desired location of the bit subgroups, for example at the most-significant bit position (MSB, Most Significant Bit).

The data field 22 for synchronous data is typically adjoined, but not necessarily, by a further data field 24 for asynchronous data. This data field 24 for asynchronous data serves the purpose of permitting the most flexible data transmission possible between the subscribers, in which the data width of the data to be transmitted has a variable width. The data field 24 is adjoined by a check and control field 25, which has, inter alia, check and control bits for controlling the data transmission.

The bit group 2 represented in FIG. 2 has not been represented to scale for the sake of a clear representation.

To be able to transmit data in a communication network corresponding to FIG. 1 between the multiplicity of subscribers 10, 11, 12, 13 connected to one another, a region within a bit group 2 which is reserved for the source data transmitted in a continuous data stream may be subdivided into a plurality of bit subgroups 23 of the same length, it being possible for the source data attributed to each bit subgroup 23 to be assigned to a specific subscriber 10, 11, 12, 13 in accordance with the control data.

The exact method of data transmission according to the invention in a communication network having a ring configuration is explained in more detail below with reference to FIGS. 3 and 4. For the sake of better clarity, the fields 24, 25 arranged after the data field 22 and shown in FIG. 2 are not represented in FIGS. 3 and 4.

Figure 3:
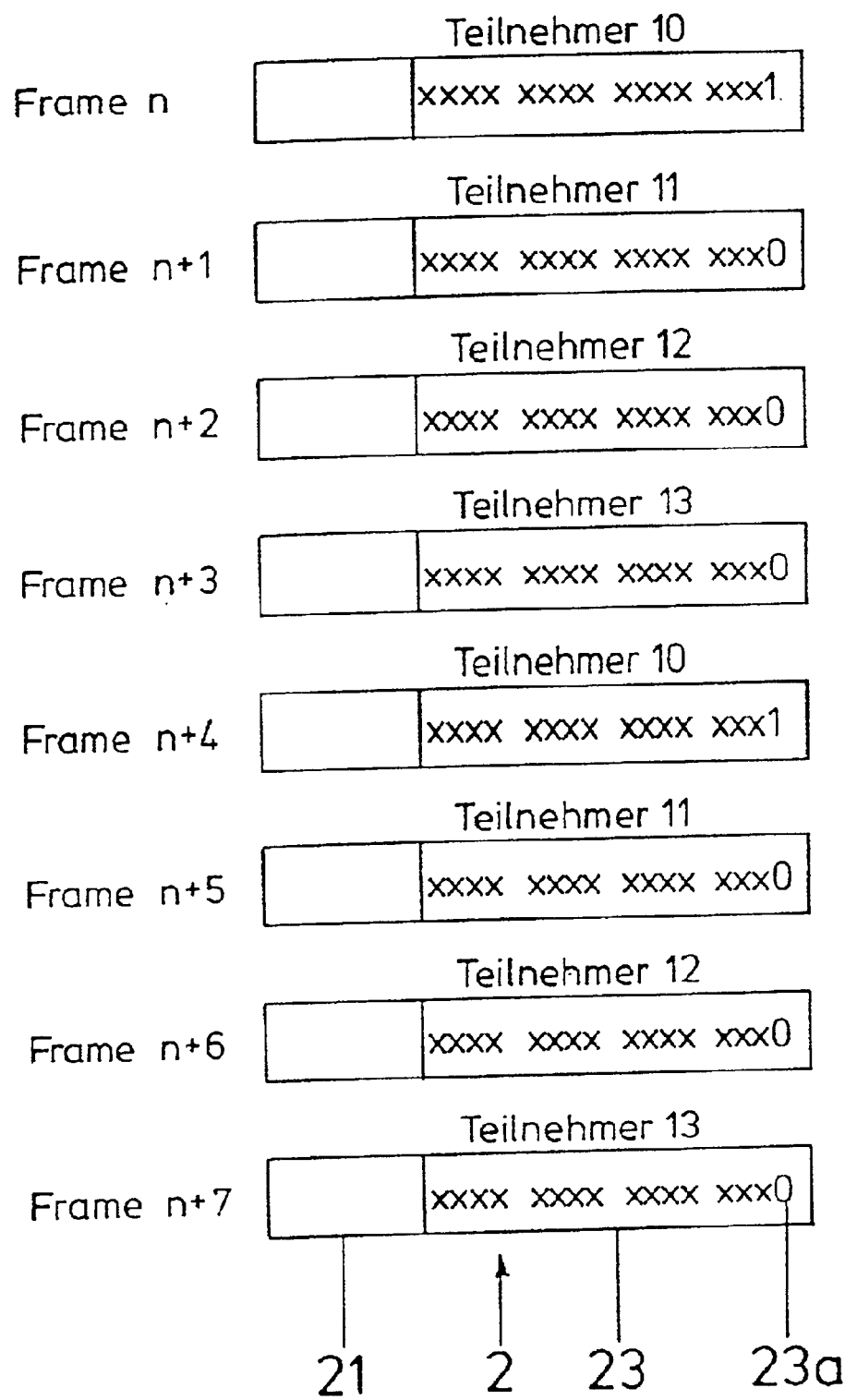
FIG. 3 schematically shows the data transmission in the case of four subscribers by means of a communication network with four times the sampling frequency.

FIG. 3 shows on the basis of eight bit groups 2 sent one after the other via the communication network 1, that is to say frame n to frame n+7, the method of data transmission according to the invention with four network subscribers 10. . . 13. For the data transmission method represented in FIG. 3, a communication network corresponding to FIG. 1 is used, that is to say a communication network 1 with four connected subscribers 10 . . . 13. The data transmitted by the subscribers 10 . . . 13 have a data width of 16 bits. The sampling frequency f1 of the communication network 1 in the present exemplary embodiment is four times as high as the sampling frequency f2 of the subscribers 10 . . . 13. Since the sampling frequency f2 of the subscribers 10 . . . 13 is consequently approximately one-quarter of the sampling frequency f1 of the communication network 1, the data of a specific subscriber 10 can be transmitted with every fourth bit group 2. In the interim time, the remaining three subscribers 11 . . . 13 can transmit data on the same position of another bit group 2. In this way, a data transmission effectively takes place in each of the four successive bit groups 2.

However, only fifteen bits can be used here for data communication, since the LSB 23*a* is required for identifying a significant subscriber 10. For identification, the LSB 23*a* in the case of this significant subscriber 10 is set to a high logic level "1", while the LSB 23*a* in the case of the other subscribers 11 . . . 13 is set to an opposed, low logic level "0". This procedure ensures that the individual subscribers 10 . . . 13 and consequently the corresponding data can be unequivocally identified on account of the unidirectional data transmission of the communication network 1 designed in the form of a ring. Although one bit is lost here for the data transmission, this is acceptable, since a comparatively very much higher efficiency of data transmission can be ensured by the method according to the invention.

In addition, in particular in the case of the data transmission of digitally sampled audio signals, as typically takes place in the case of the MOST networks mentioned at the beginning, it is possible to dispense with a single bit in the data transmission without having to accept a significant loss in quality as a result.

FIG. 4 shows a further-developed method of data transmission, in which not only the 15-bit wide data field 23, which is identified by the LSB 23*a*, but also a separate, second data field 23, which is 16 bits wide, is transmitted within a bit group 2. The corresponding communication network 1 may in this case be designed for up to eight subscribers 10 . . . 17. For this second data field 23, preferably no LSB 23*a* is required for identification, since, when a single subscriber 10 is unequivocally identified, as already mentioned above, all the subscribers 10 . . . 17 are unequivocally identifiable on account of the ring-shaped structure of the communication network 1, which is uni-directionally operated. In this case, subscriber 10 is unequivocally identified by means of the LSB 23*a*, which has been set to "1". The other subscribers 11 . . . 17 of the communication network 1 are consequently likewise uniquely determined, for example subscriber 10 together with subscriber 14, subscriber 11 together with subscriber 15, etc. The subscriber 10 . . . 17 receiving data consequently only has to determine the appearance of the LSB 23*a* set to "1" for the subscriber 10 and count the corresponding subsequent bit groups 2 to be able to read out the data of the correspondingly desired subscriber 10 . . . 17.

The present invention, therefore, is well adapted to carry out the objects and attain both the ends and the advantages mentioned, as well as other benefits inherent therein. While the present invention has been depicted, described, and is defined by reference to particular embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described embodiments of the invention are exemplary only, and are not exhaustive of the scope of the invention. Consequently, the invention is intended to be limited only by the spirit and scope of the appended claims, giving full cognizance to equivalents in all respects.

ELEMENT LIST

1 communication network
2 (first, significant) subscriber, clock generator
11 . . . 13 (further) subscribers
14 . . . 17 data transmission lines
2 bit group
21 preamble
22 data field (for synchronous data)
23 bit subgroups
23*a* significant bit, LSB
24 data field (for asynchronous data)
25 check/control field

What is claimed is:

1. A method of joint data transmission of digital source data and control data between data source and data sinks that are subscribers of a uni-directionally operated communication network having a ring configuration, said method comprising the step of:

(a) transmitting, in a continuous data stream, the source data and the control data in a format which prescribes a clocked sequence of individual bit groups of the same bit width, the format having reserved predetermined bit positions;

(b) sampling data by the subscribers with a first sampling frequency, the communication network samples data with a second sampling frequency, the second sampling frequency being an integral multiple of the first sampling frequency;

(c) assigning, with each bit group at least one contiguous region having a predetermined number of reserved bit positions for source data, the contiguous region(s) being assigned to a subscriber address; and (d) assigning, with at least one contiguous region of a bit group, a significant bit position;

wherein one of the subscribers is set to a first logic level and all the other subscribers are set to an opposed, second logic level.

2. The method according to claim 1, wherein the first sampling frequency and the second sampling frequency are synchronized to a clock-pulse signal.

3. The method according to claim 1, wherein for at least one subscriber, the second sampling frequency has any desired phase shift with respect to the first sampling frequency.

4. The method according to claim 1, wherein the multiple of the first sampling frequency corresponds exactly to the number of subscribers of the communication network.

5. The method according to claim 1, wherein the number of subscribers of the communication network is an integral multiple of the multiple of the first sampling frequency.

6. The method according to claim 1, wherein the significant bit position within the contiguous region is the least-significant bit position (LSB) for source data.

7. The method according to claim 1, wherein at least some of the subscribers of the communication network are designed as microphone units, with the corresponding analog audio signal being sampled for the assigned microphone units and fed to the communication network in the form of digital signals.

8. The method according to claim 1, wherein the communication network is designed as a MOST network.

* * * * *